(12) United States Patent
Yoshida

(10) Patent No.: US 11,917,301 B2
(45) Date of Patent: Feb. 27, 2024

(54) IMAGE CAPTURING APPARATUS AND METHOD FOR CONTROLLING IMAGE CAPTURING APPARATUS

(71) Applicant: CANON KABUSHIKI KAISHA, Tokyo (JP)

(72) Inventor: Akimitsu Yoshida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/974,966

(22) Filed: Oct. 27, 2022

(65) Prior Publication Data

US 2023/0139034 A1  May 4, 2023

(30) Foreign Application Priority Data

Nov. 2, 2021 (JP) ................. 2021-179591

(51) Int. Cl.

| | |
|---|---|
| *H04N 23/72* | (2023.01) |
| *H04N 23/60* | (2023.01) |
| *H04N 23/71* | (2023.01) |
| *H04N 23/611* | (2023.01) |
| *H04N 23/67* | (2023.01) |
| *H04N 23/743* | (2023.01) |

(52) U.S. Cl.
CPC .......... *H04N 23/72* (2023.01); *H04N 23/611* (2023.01); *H04N 23/64* (2023.01); *H04N 23/676* (2023.01); *H04N 23/71* (2023.01); *H04N 23/743* (2023.01)

(58) Field of Classification Search
CPC ...... H04N 23/72; H04N 23/611; H04N 23/64; H04N 23/676; H04N 23/71; H04N 23/743; H04N 23/661; H04N 23/634; H04N 23/617; H04N 23/631; H04N 23/633; H04N 23/635
See application file for complete search history.

(56) References Cited

U.S. PATENT DOCUMENTS

2020/0372258 A1* 11/2020 Kobayashi ........... G06V 40/166
2022/0301315 A1*  9/2022 Okada .................... G06V 20/58

FOREIGN PATENT DOCUMENTS

| JP | 2021-093568 A | 6/2021 |
|---|---|---|
| WO | 2020/080037 A1 | 2/2021 |

* cited by examiner

*Primary Examiner* — Yogesh K Aggarwal
(74) *Attorney, Agent, or Firm* — Cowan, Liebowitz & Latman, P.C.

(57) ABSTRACT

An image capturing apparatus includes: an image capturing unit configured to control an imaging sensor; a first obtaining unit configured to obtain a first detection result that is a result of detection of a subject from image data captured by the image capturing unit; a second obtaining unit configured to transmit the image data to an external image processing apparatus and obtain a second detection result that is a result of detection of a subject from the image data by the image processing apparatus; and a control unit configured to perform shooting processing using settings of shooting parameters determined based on at least one of the first detection result and the second detection result, wherein the control unit is configured to perform shooting processing using settings of the shooting parameters determined based on the first detection result until the second detection result is obtained from the image processing apparatus.

14 Claims, 7 Drawing Sheets

FIG. 3

|  | SUBJECT DETECTION BY CAMERA | SUBJECT DETECTION BY CLOUD SERVER |
|---|---|---|
| DETECTION SPEED | FAST | SLOW |
| DETECTABLE SUBJECT TYPES | FEW | MANY |
| DETECTION ACCURACY | LOW | HIGH |

FIG. 5A
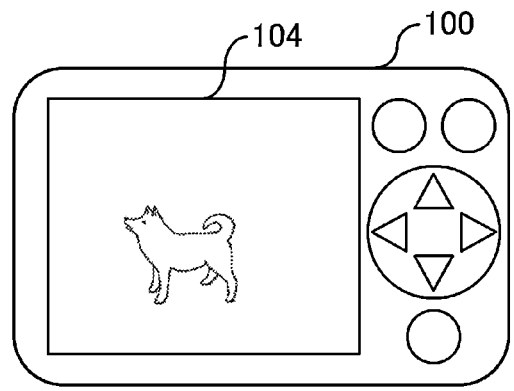
FIG. 5B
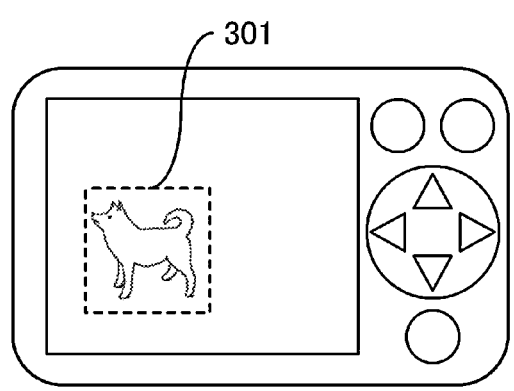
FIG. 5C
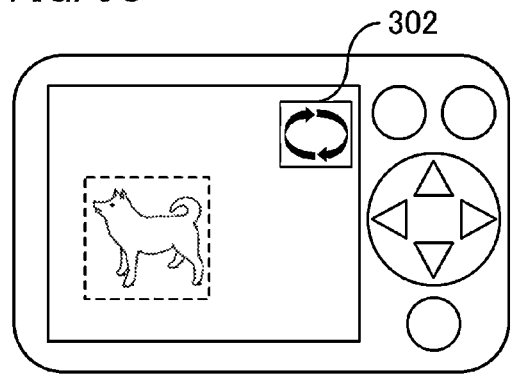
FIG. 5D
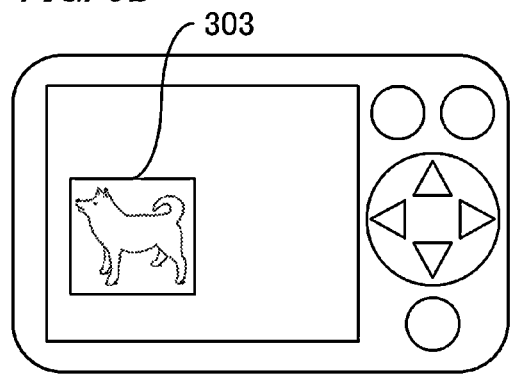
FIG. 5E
|  | CAMERA | CLOUD SERVER | MAIN SUBJECT |
|---|---|---|---|
| FIG. 5A | NOT DETECTED | NOT DETECTED | NONE |
| FIG. 5B | DETECTED | NOT DETECTED | DOG |
| FIG. 5C | DETECTED | DETECTING | DOG |
| FIG. 5D | – | DETECTED | AKITA DOG |

FIG. 6A
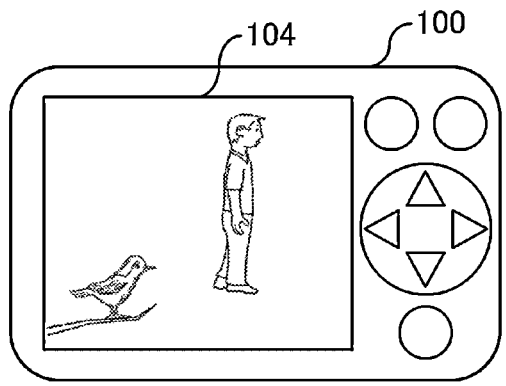
FIG. 6B
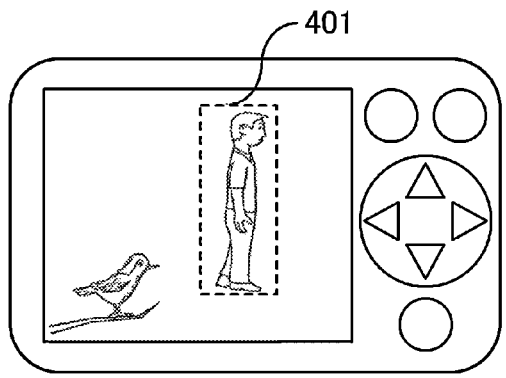
FIG. 6C
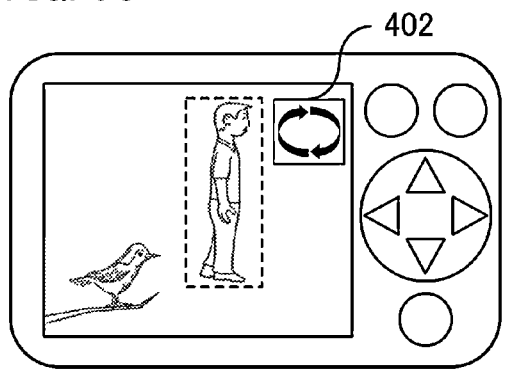
FIG. 6D
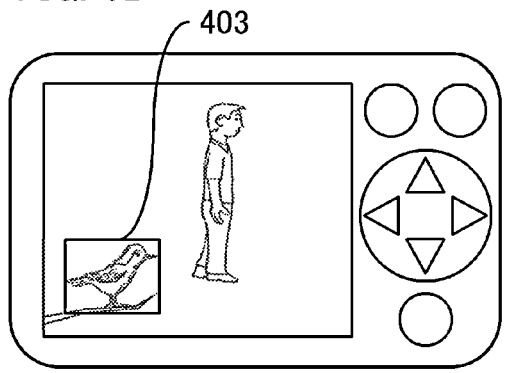
FIG. 6E
|         | CAMERA       | CLOUD SERVER | MAIN SUBJECT |
|---------|--------------|--------------|--------------|
| FIG. 6A | NOT DETECTED | NOT DETECTED | NONE         |
| FIG. 6B | DETECTED     | NOT DETECTED | PERSON       |
| FIG. 6C | DETECTED     | DETECTING    | PERSON       |
| FIG. 6D | –            | DETECTED     | BIRD         |

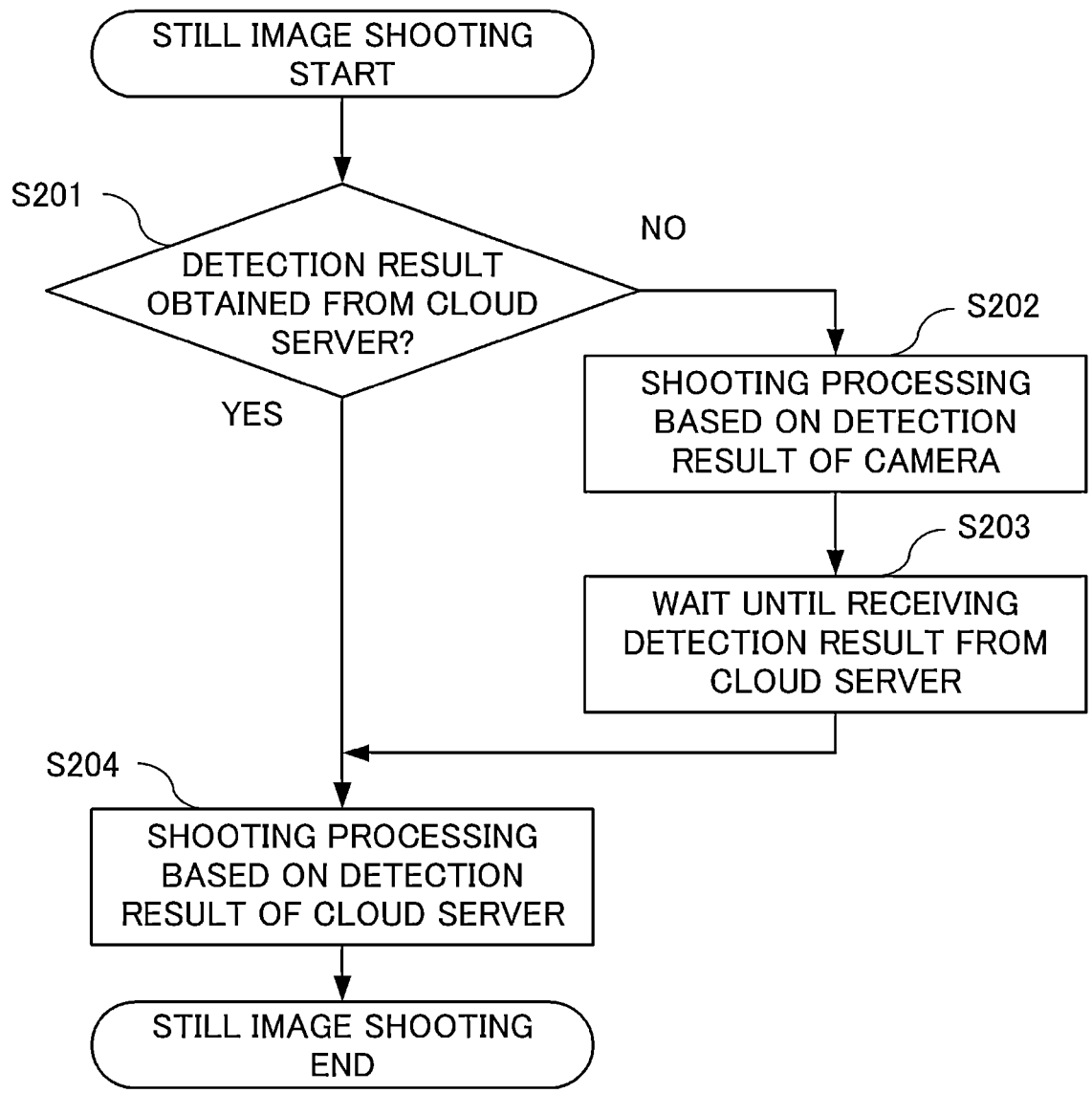

IMAGE CAPTURING APPARATUS AND METHOD FOR CONTROLLING IMAGE CAPTURING APPARATUS

BACKGROUND OF THE INVENTION

Field of the Invention

The present invention relates to an image capturing apparatus and a method for controlling an image capturing apparatus.

Description of the Related Art

An image processing method that automatically detects a specific subject from an image is used as a useful technique in image capturing apparatuses and the like. For example, an image capturing apparatus detects a specific area of a subject, such as a person's face, from a captured image and optimizes focus and exposure of the detected area.

In recent years, image capturing apparatuses are known that have the function of detecting a subject using machine learning, typified by a neural network.

International Publication No. 2020/080037 discloses an image capturing apparatus that detects subjects such as people and animals using a learned model (dictionary) prepared for each preset category. To enable the detection of various subjects, a learned model is prepared for each subject to be detected, increasing the storage space to be used. In this respect, Japanese Patent Application Publication No. 2021-093568 proposes an image capturing apparatus that enables the detection of various subjects by replacing a learned model as required.

However, even when the storage space to be used is reduced and the detection of various subjects is enabled, the circuit size of the subject detection circuit in the image capturing apparatus determines the performance of subject detection. For this reason, an attempt to increase the speed and accuracy of recognition involves cost issues.

SUMMARY OF THE INVENTION

The present disclosure provides an image capturing apparatus that improves the speed and accuracy of the recognition of subjects while limiting an increase in the circuit size of the subject detection circuit in the image capturing apparatus.

The image capturing apparatus according to the present disclosure includes at least one memory and at least one processor which function as: an image capturing unit configured to control an imaging sensor; a first obtaining unit configured to obtain a first detection result that is a result of detection of a subject from image data captured by the image capturing unit; a second obtaining unit configured to transmit the image data to an external image processing apparatus and obtain a second detection result that is a result of detection of a subject from the image data by the image processing apparatus; and a control unit configured to perform shooting processing using settings of shooting parameters determined based on at least one of the first detection result and the second detection result, wherein the control unit is configured to perform shooting processing using settings of the shooting parameters determined based on the first detection result until the second detection result is obtained from the image processing apparatus.

Further features of the present invention will become apparent from the following description of exemplary embodiments with reference to the attached drawings.

BRIEF DESCRIPTION OF THE DRAWINGS

FIG. 3 is a diagram showing characteristics of subject detection by a camera and a cloud server;

FIGS. 5A to 5E are diagrams showing an example in which the same subject type is detected by the cloud server;

FIGS. 6A to 6E are diagrams showing an example in which a different subject is detected by the cloud server; and FIG. 7 is a flowchart illustrating still image shooting processing.

DESCRIPTION OF THE EMBODIMENTS

Embodiments

Figure 1:
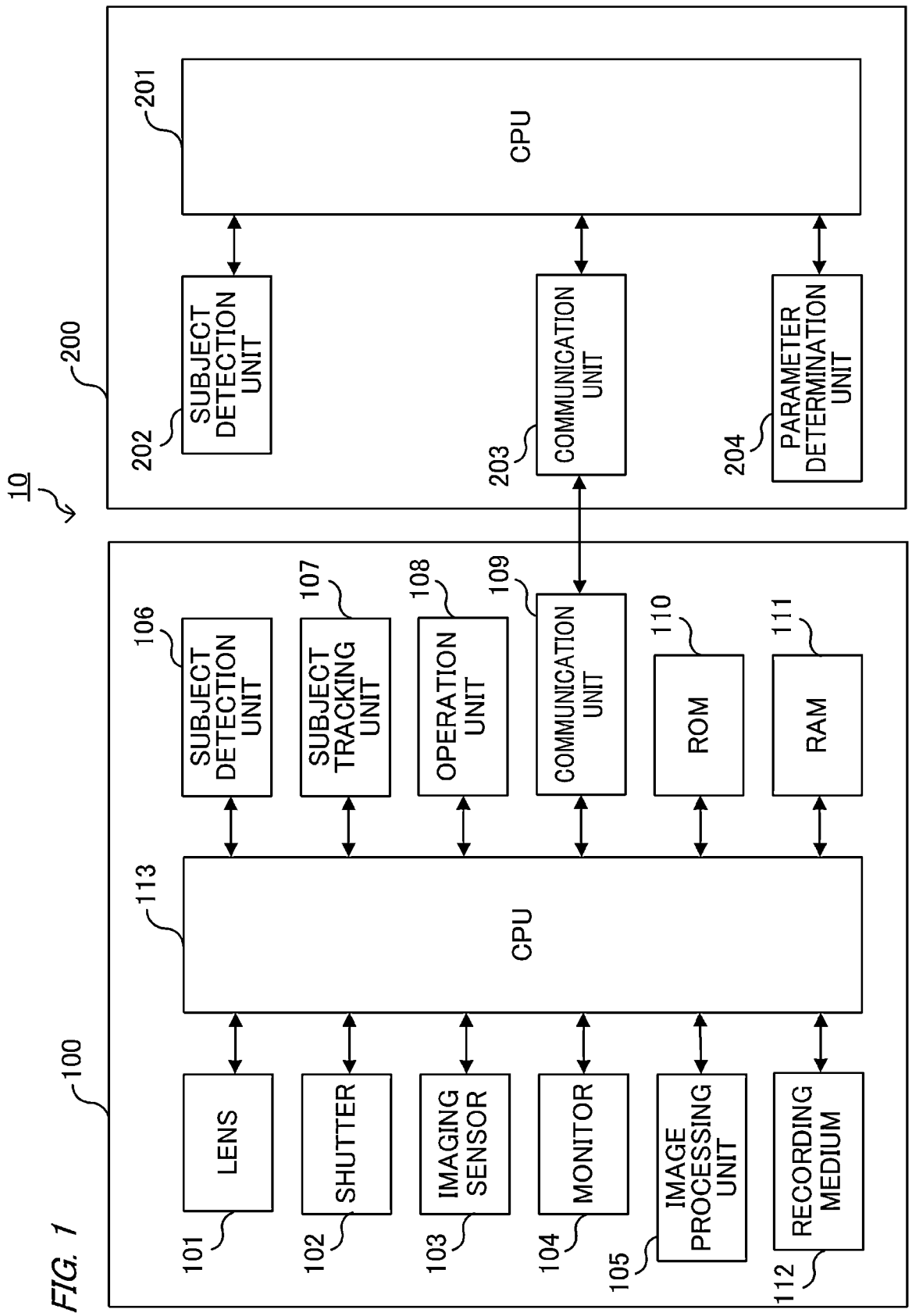
FIG. 1 is a diagram illustrating an example of the configuration of an image capturing system.

Referring to the drawings, embodiments of the present invention are now described in detail.

FIG. 1 is a diagram illustrating an example of the configuration of an image capturing system 10 of an embodiment. The image capturing system 10 includes a camera 100 as an image capturing apparatus and a cloud server 200 as an image processing apparatus that can communicate with the image capturing apparatus. In the present embodiment, the image capturing apparatus is described as the camera 100 (digital camera), but any apparatus capable of shooting may be used, such as a personal computer, a smartphone, a tablet terminal, a game machine, a robot, or the like. Also, the image processing apparatus external to the image capturing apparatus is described as the cloud server 200, but any apparatus capable of image processing such as detecting a subject from image data may be used, and may be a mobile terminal such as a smartphone, a personal computer, or the like.

The configuration of the camera 100 is first described. The camera 100 has a CPU 113 that controls the processes of each component. A lens 101 is detachable from the camera 100 and adjusts the focal distance (focus) and the amount of light incident on an imaging sensor 103.

A shutter 102 adjusts the exposure time of the imaging sensor 103. The shutter 102 has a release switch SW1 and a release switch SW2. The release switch SW1 is turned on during an operation of the shutter 102 by what is called a half-press (shooting preparation instruction). The release switch SW2 is turned on upon completion of an operation of the shutter 102 by what is called a full-press (shooting instruction).

In the imaging sensor 103, pixels including photoelectric conversion portions are two-dimensionally arranged. The pixels photoelectrically convert a subject optical image formed by the lens 101 into image signals. The imaging sensor 103 sends these image signals to an image processing unit 105. The image signals photoelectrically converted by the imaging sensor 103 are referred to as RAW data.

The image processing unit 105 generates image data by developing the received RAW data. The development processing includes processing such as white balance processing, matrix conversion processing, gamma processing, color tone correction processing using a Look-Up-Table (LUT), and gradation correction processing. The image processing unit 105 also uses the RAW data to perform AF processing (autofocus processing) and AE processing (automatic exposure processing, autoexposure processing).

A subject detection unit 106 detects a subject from the image data generated by the image processing unit 105. The subject detection unit 106 detects a subject such as a person or an animal (such as a dog or a cat) and transmits the subject detection result to the CPU 113. The subject detection result includes the subject type, such as a person or an animal, and the position of the subject within the image data. In a case where the subject detection unit 106 does not detect a specific subject that is predetermined, the CPU 113 determines a subject based on information from the image processing unit 105, such as the color information and histogram information of the image data.

An operation unit 108 is a group of input devices that are operable by the user. The operation unit 108 includes input devices such as a release button, a power switch, direction keys, an enter button, a menu button, an operation mode selection dial, and a touch panel. When the CPU 113 detects an operation by the user through the operation unit 108, the CPU 113 performs various processes according to the detected operation. 108

A communication unit 109 transmits the image data generated by the image processing unit 105 to the cloud server 200 via a communication unit 203. The communication unit 109 can communicate with the communication unit 203 by Wi-Fi, which is a wireless LAN standard specified by IEEE802.11, for example. However, the communication method is not limited to Wi-Fi and may include Bluetooth (registered trademark), an infrared communication method, or a wired USB communication method.

ROM 110 stores a program for controlling the camera 100. When the power switch of the operation unit 108 is turned on, the CPU 113 loads the program stored in the ROM 110 into RAM 111 and starts an operation of the camera 100.

The RAM 111 is a memory area that temporarily holds the RAW data transmitted from the imaging sensor 103, the image data generated by the image processing unit 105, and the program used to operate the camera 100. A recording medium 112 is a non-volatile memory for recording the RAW data transmitted from the imaging sensor 103 and the image data generated by the image processing unit 105.

The CPU 113 determines the settings of shooting parameters based on the result of subject detection by the subject detection unit 106. The shooting parameters are parameters for processing such as AF processing, AE processing, white balance processing, brightness correction processing, color tone correction processing, and gradation correction processing. The CPU 113 transmits the setting information of the determined shooting parameters to the image processing unit 105. The image processing unit 105 uses the received shooting parameter setting information to perform shooting processing on the image data of subsequent frames.

The shooting processing includes a process of obtaining RAW data and development processing. Specifically, the shooting processing includes AF processing, AE processing, and development processing such as white balance processing, brightness correction processing, color tone correction processing, and gradation correction processing. The CPU 113 may use the detection result of the cloud server 200 to perform appropriate shooting processing. However, some processing that needs to be fast, such as AF processing and AE processing, may be performed based on the detection result obtained by the camera 100.

To perform still image shooting operation, live view operation, and moving image shooting operation, the CPU 113 controls the processes of each component of the camera 100. Also, based on the result of subject detection by the subject detection unit 106, the CPU 113 controls the AF processing and AE processing performed by the image processing unit 105.

A monitor 104, which may be a liquid crystal display (LCD), is a device for displaying live view images, the menu screen, and the like to a user. The monitor 104 allows for touch operation, and the user can change various settings of the camera 100 and perform various operations by touching a predetermined position.

The configuration of the cloud server 200 is now described. A subject detection unit 202 detects a subject captured in the image data transmitted from the camera 100 and transmits the subject detection result to the camera 100 via the communication unit 203.

Based on the result of subject detection by the subject detection unit 202, a parameter determination unit 204 determines the settings of shooting parameters to be used by the image processing unit 105. A CPU 201 transmits, as a detection result, the information of the subject detected by the subject detection unit 202 and the shooting parameter setting information determined by the parameter determination unit 204 to the camera 100 via the communication unit 203.

A subject tracking unit 107 identifies and tracks the position of the subject based on the result of subject detection by the subject detection unit 106 or the subject detection unit 202. The subject tracking unit 107 can track the position of the subject using the color information or brightness information of the image data generated by the image processing unit 105, for example.

Figure 2:
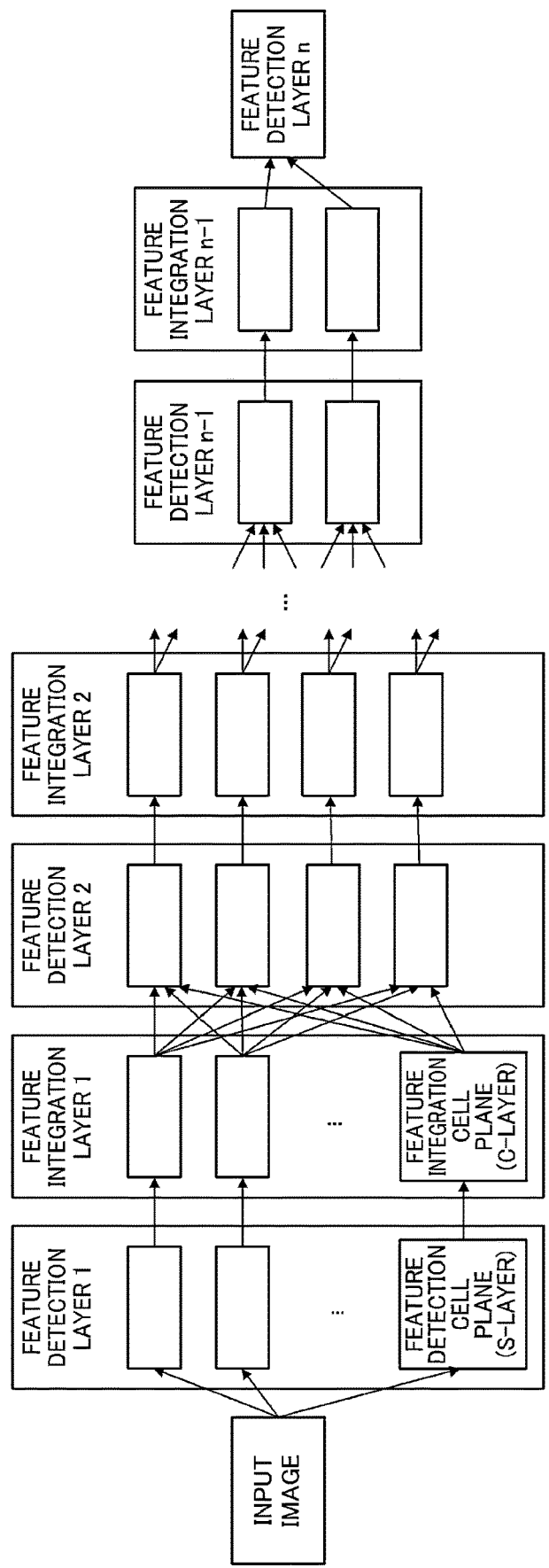
FIG. 2 is a diagram illustrating the flow of processing using a neural network.

Referring to FIG. 2, the subject recognition by the subject detection unit 106 and the subject detection unit 202 is now described. A technique called deep learning is known as a technique to learn and recognize a subject in an image. A convolutional neural network (hereinafter referred to as a CNN) is a representative method of deep learning.

A general CNN involves multi-step calculations. A convolutional layer in a CNN performs a convulsion operation to spatially integrate local features of an image and inputs the features into neurons of the intermediate layer of the next stage. Furthermore, the features are compressed in the spatial direction by an operation called pooling or subsampling. Since the CNN can obtain complex feature representations through multistage feature conversion, the category recognition and detection of subjects in images can be performed with high accuracy based on features. In machine learning represented by the CNN, image signals and corresponding teacher signals are learned as a set. Through learning, the learned model is generated as processing parameters for subject detection.

For example, the subject detection unit 106 may detect a subject using a learned model based on neocognitron, which is a type of a CNN. The learned model does not have to be generated using the neocognitron, and may be generated using a generative adversarial network (GAN), a recursive recurrent neural network (RNN), or the like. Also, the learned model may be generated by machine learning without using a neural network.

Referring to FIG. 2, the process of detecting a subject from input image data using a CNN is now described. FIG. 2 shows the flow of a basic subject detection process using a CNN. The CNN has multiple stages, each including two layers called a feature detection layer (S-layer) and a feature integration layer (C-layer). In the example of FIG. 2, an input image input to the CNN is sequentially processed from the first stage to the n-th stage.

An S-layer corresponds to a convolutional layer, whereas a C-layer corresponds to a pooling or subsampling layer. In the CNN, an S-layer first detects features of the input image based on the features detected in the previous stage. Then, the features detected in the S-layer are integrated in the C-layer and input to the next stage as the detection result of the current stage.

The S-layer includes multiple feature detection cell planes, each of which detects a different feature. The C-layer includes multiple feature integration cell planes and pools or sub samples the detection results obtained in the immediately preceding feature detection cell planes. The output layer (n-th stage), which is the final stage, has an S-layer but not a C-layer.

One feature detection cell plane consists of multiple feature detection neurons, each of which is connected to the C-layer of the previous stage with a predetermined structure. Also, one feature integration cell plane consists of multiple feature integration neurons, each of which is connected to the S-layer of the same stage with a predetermined structure.

The CNN adjusts the connection coefficient of each feature integration neuron to an appropriate value in order to detect a specific feature. The connection coefficient is a coefficient adjusted through learning. In the feature detection layer (S-layer) of the final stage (n-th stage), the connection coefficients may be modified using the least squares method, for example. In the feature detection layers (S-layers) of the other stages (the 1st to n-1th stages), the connection coefficients may be modified using the error backpropagation method, for example. A known technique can be used as the connection coefficient modification technique using the least squares method and the error backpropagation method. Examples of a reference include Alex Krizhevsky, et al. "ImageNet Classification with Deep Convolutional Neural Networks", Advances in Neural Information Processing Systems 25 (NIPS' 12), 2012.

As the test patterns for learning, patterns that should be detected and patterns that should not be detected are prepared. Each test pattern has image data and a corresponding teacher signal. The image data corresponding to the pattern that should be detected is assigned a teacher signal that causes the output of a neuron corresponding to the region in which the pattern to be detected is present in the feature detection cell plane in the final stage to be 1. In contrast, the image data corresponding to the pattern that should not be detected is assigned a teacher signal that causes the output of a neuron corresponding to the region in which the pattern that should not be detected is present to be −1.

The learned model (dictionary) of the present embodiment may be prepared by learning test patterns using image data based on image signals obtained by the imaging sensor 103. The learned model may be generated by a device other than the camera 100. The learned model is stored in the ROM 110. The subject detection unit 106 uses the learned model stored in the ROM 110 to detect a subject captured in image data.

In the same manner as the subject detection unit 106, the subject detection unit 202 of the cloud server 200 can detect a subject using a learned model generated by neocognitron, which is a type of CNN. The subject detection unit 106 of the camera 100 is subject to constraints on the circuit size, the number of learned models that can be stored in the ROM 110, and the like. Unlike the subject detection unit 106, the subject detection unit 202 is not subject to constraints on the circuit size, the number of learned models that can be stored, and the like, and thus can detect a subject using more complex network models. Accordingly, the subject detection unit 202 has higher subject detection accuracy than the subject detection unit 106 and can detect more types of subjects.

The detection accuracy as used herein is the accuracy in two types of abilities. One of the abilities is to detect whether a subject is captured in the image data and prevent erroneous detection when a subject is not captured. The other is the ability to detect more detailed features of the subject. For example, a configuration that can detect the breed of a dog when detecting dogs has higher detection accuracy than a configuration that detects a subject only as a dog.

Since the camera 100 is connected to the cloud server 200 via a network, the time required to obtain (receive) a detection result from the cloud server 200 after sending image data is longer than the time required to obtain a detection result from the subject detection unit 106.

FIG. 3 shows characteristics of the subject detection by the subject detection unit 106 of the camera 100 and the subject detection unit 202 of the cloud server 200. The subject detection speed of the camera 100 is faster than that of the cloud server 200. This detection speed is the subject detection speed determined taking into account the time for transmitting image data from the camera 100 to the cloud server 200 and the time for transmitting the detection result from the cloud server 200 to the camera 100. The types of subjects that can be detected by the camera 100 are less than those by the cloud server 200. The detection accuracy of the camera 100 is lower than that of the cloud server 200.

Live View Shooting

Figure 4:
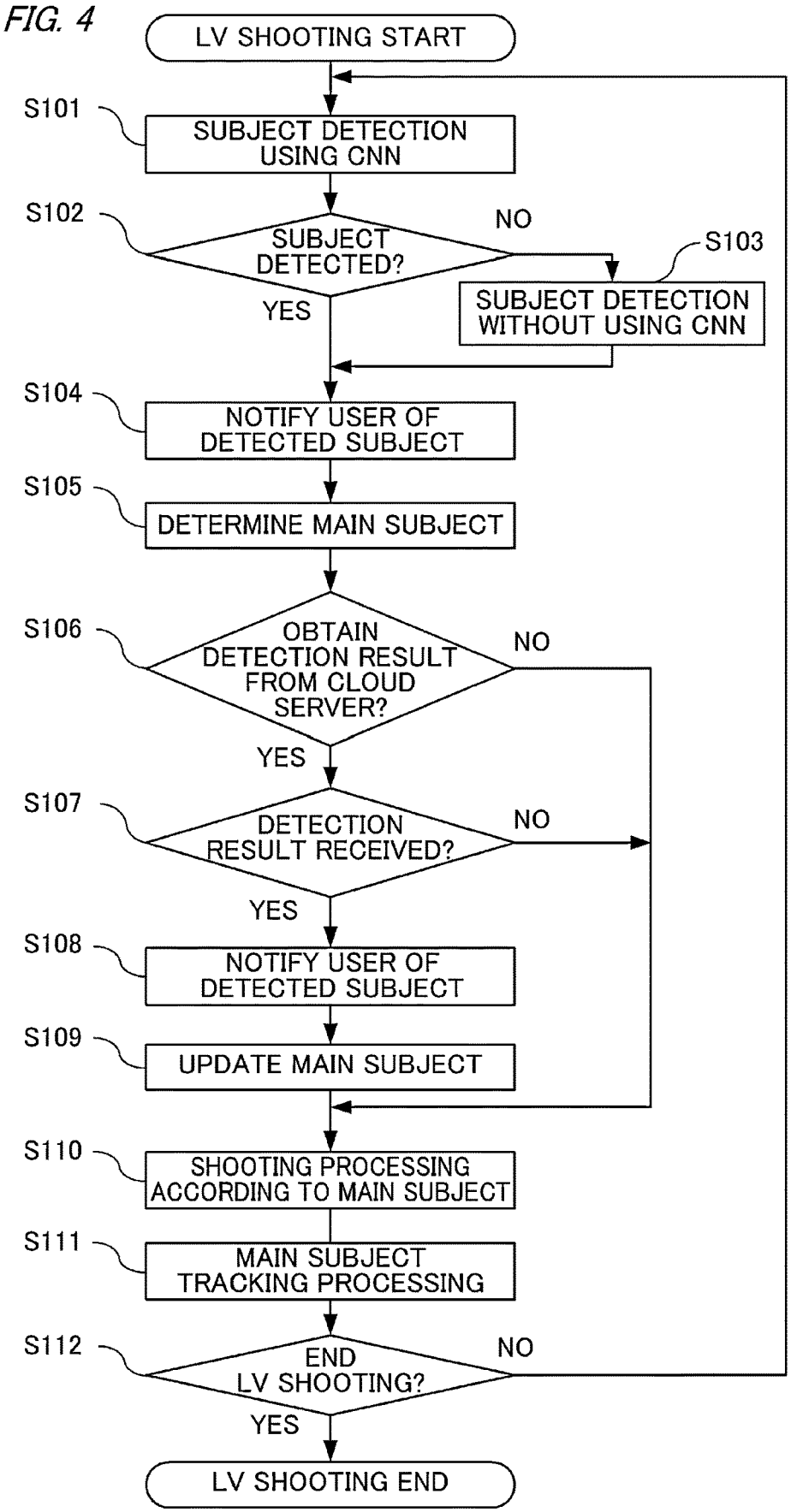
FIG. 4 is a flowchart of an example of live view shooting processing.

Referring to FIG. 4, the live view shooting (LV shooting) of the camera 100 is now described. FIG. 4 is a flowchart of an example of live view shooting processing. This LV shooting processing is processing for displaying an image captured by the camera 100 on the monitor 104. For example, the LV shooting processing may start when the power of the camera 100 is turned on.

At S101, the subject detection unit 106 (first obtaining unit) performs subject detection processing using a CNN on the image data generated by the image processing unit 105. The algorithm for subject detection is not limited to a CNN, and may be other deep learning algorithms such as R-CNN, YOLO, and SSD.

At S102, the CPU 113 determines whether the subject detection unit 106 has detected a subject. In a case where the subject detection unit 106 has detected a subject, the process proceeds to S104. In a case where the subject detection unit 106 has not detected a subject, the process proceeds to S103.

At S103, the CPU 113 (first obtaining unit) performs subject detection processing on the image data without using the CNN. For example, the CPU 113 may detect a moving subject identified using a motion vector, a subject closer to the camera 100 identified using distance information, and a subject identified using the color information or histogram information. The CPU 113 may also detect a subject based on information of a combination of the motion vector, distance information, color information, and histogram information.

At S104, the CPU 113 controls the display of the monitor 104 to notify the user of the subject detected at S101 or S103. For example, the CPU 113 may notify the user by enclosing the detected subject with a bounding box.

The CPU 113 performs AF processing and AE processing based on the subject detection result (first detection result) at S101 or S103. In a case where a subject detection result has already been obtained from the cloud server 200, the CPU 113 may perform AF processing and AE processing based on this subject detection result (second detection result) obtained by the cloud server 200.

At S105, the CPU 113 determines the subject detected at S101 or S103 as the main subject. In a case where multiple subjects are detected, the CPU 113 may determine a subject closer to the camera 100, a subject closer to the center of the angle of view, or a subject of a preset type (e.g., person or animal) as the main subject. The process of S105 may be performed before S104.

At S106, the CPU 113 determines whether to obtain a subject detection result from the cloud server 200. In a case where a predetermined condition is satisfied, the CPU 113 (second obtaining unit) transmits the image data to the cloud server 200 and obtains the result of subject detection by the subject detection unit 202 from the cloud server 200.

For example, the predetermined condition may be that a subject detection result has never been obtained from the cloud server 200 since starting LV shooting, or that a predetermined time has elapsed since receiving a subject detection result from the cloud server 200, for example. Furthermore, the predetermined condition may be that the subject detection unit 106 has detected a new subject, or the subject detected by the cloud server 200 has disappeared from the angle of view, in other words, that the subject tracking unit 107 has lost sight of the subject. Additionally, the predetermined condition may be that the scene has changed. For example, a scene change may be determined using the color information or brightness information of the image data.

In a case where the predetermined condition is satisfied and thus the CPU 113 determines that a subject detection result is to be obtained from the cloud server 200, the process proceeds to S107. In a case where the CPU 113 determines that a subject detection result is not to be obtained from the cloud server 200, the process proceeds to S110.

At S107, the CPU 113 determines whether a detection result has been received from the cloud server 200. Specifically, the CPU 113 first transmits the image data to the cloud server 200 via the communication unit 109. Then, the subject detection unit 202 of the cloud server 200 detects a subject from the received image data.

In a case where a subject is detected, the parameter determination unit 204 determines the settings of shooting parameters according to the detected subject. The CPU 201 of the cloud server 200 transmits, as the detection result, the information of the detected subject and the determined shooting parameter setting information to the camera 100 via the communication unit 203. In a case where the subject detection unit 202 does not detect a subject, the CPU 201 notifies the camera 100 that the subject is not detected from the received image data.

In a case where the camera 100 receives the detection result, the process proceeds to S108. In a case where the camera 100 does not receive a detection result, or receives a notification that the subject is not detected from the image data, the process proceeds to S110.

At S108, the CPU 113 controls the display of the monitor 104 to notify the user of the subject of the detection result obtained from the cloud server 200 at S106 and S107 (the subject detected by the subject detection unit 202). For example, the CPU 113 notifies the user by enclosing the subject of the detection result with a bounding box.

At S109, the CPU 113 updates the main subject set at S105 to the subject of the detection result obtained from the cloud server 200. The process of S109 may be performed before S108.

At S110, the CPU 113 performs shooting processing according to the main subject. For example, the shooting processing according to the main subject may be AF processing and AE processing according to the position of the main subject, or various image processing relating to other shooting parameters. In a case where the main subject is detected based on the detection result from the cloud server 200 at S108, the CPU 113 performs the shooting processing using the shooting parameter setting information determined by the parameter determination unit 204.

In a case where a detection result is not obtained from the cloud server 200 at S106 or S107, the CPU 113 performs the shooting processing using the shooting parameter settings determined by the camera 100 according to the current main subject. Also, the CPU 113 may perform the shooting processing using the shooting parameter setting information obtained from the cloud server 200 most recently.

At S111, the subject tracking unit 107 performs tracking processing of the main subject. The camera 100 may fail to detect the subject detected by the subject detection unit 202 of the cloud server 200. By tracking the subject detected by the subject detection unit 202, the CPU 113 can continue shooting processing according to the subject detected by the cloud server 200 with high accuracy.

At S112, the CPU 113 determines whether to end the LV shooting. For example, upon receiving an operation by the user to turn off the power or to switch from the shooting mode to the playback mode, the CPU 113 may determine to end the LV shooting. In a case where ending the LV shooting, the LV shooting processing shown in FIG. 4 ends. In a case where not ending the LV shooting, the process returns to S101.

Notification of Subject Detection State to User

Referring to FIGS. 5A to 5E and FIGS. 6A to 6E, the process of notifying the user of the detected subject at S104 and S108 in FIG. 4 is now described. FIGS. 5A to 5E are diagrams showing an example in which the cloud server 200 detects the same type of subject as the subject detected by the camera 100. In the example of FIGS. 5A to 5E, it is assumed that the subject detection unit 106 of the camera 100 can detect dogs and that the subject detection unit 202 of the cloud server 200 can detect more detailed features such as dog breed and coat color.

FIG. 5A shows a state in which a dog appears in the angle of view. At the instant when the dog appears, the camera 100 and the cloud server 200 have not detected a subject. The subject detection unit 106 of the camera 100 can detect a subject at a speed less than or equal to the cycle of capturing each frame in LV shooting and thus immediately detect the dog. Also, the image data shown in FIG. 5A is transmitted to the cloud server 200 in a case where a predetermined condition is satisfied.

FIG. 5B shows a state in which the dog detected by the subject detection unit 106 is enclosed by a dotted line rectangle 301 to notify the user that the dog has been detected as the subject. The dotted line rectangle indicates the detection result based on the subject detection performed by the subject detection unit 106, that is, by the camera 100, indicating that the subject is not based on detection by the cloud server 200. Meanwhile, upon receiving the image data from the camera 100, the subject detection unit 202 of the cloud server 200 detects a subject from the image data (S107 in FIG. 4).

FIG. 5C shows a state of waiting for a detection result from the cloud server 200. The detection speed in terms of the time between the transmission of the image data to the cloud server 200 from the camera 100 and the obtainment of a detection result from the cloud server 200 is slower than the detection speed of the subject detection unit 106 in detecting a subject from the image data. As shown in FIG. 5C, to notify the user that a detection result from the cloud server 200 is being obtained, the CPU 113 displays an icon (item) 302 indicating that a subject is being detected by the cloud server 200. The use of the result of subject detection by the cloud server 200 improves the shooting results. Thus, the CPU 113 displays the icon 302 to encourage the user to wait.

FIG. 5D shows a state in which a subject detection result has been received from the cloud server 200 and the subject detected by the subject detection unit 202 is enclosed by a solid line rectangle 303 to notify the user that the subject is set as the main subject. This allows the user to know that the subject is detected based on the detection result by the cloud server 200. In this manner, the subject based on the detection result by the camera 100 is enclosed by the dotted line rectangle 301, whereas the subject based on the detection result by the cloud server 200 is enclosed by the solid line rectangle 303. This allows the user to distinguish on which detection result the subject is based. As long as the user can distinguish on which detection result the subject is based, the display style of the frame enclosing the subject is not limited to the dotted line or solid line rectangle. The distinguishment may be provided by other shapes, line types, or line colors.

In a case where the subject detection unit 202 detects the subject as an Akita dog, the parameter determination unit 204 determines the settings of shooting parameters using the feature of the coat color of the Akita dog to calculate the white balance and the like. The camera 100 can achieve more accurate white balance and the like by using the shooting parameter setting information in the detection result received from the cloud server 200 to perform shooting processing.

FIG. 5E is a diagram showing the subject detection states and the main subjects in the states shown in FIGS. 5A to 5D. In the state of FIG. 5A, neither the camera 100 nor the cloud server 200 has detected a subject, and the main subject is not set. In the state of FIG. 5B, the camera 100 has detected a subject, the cloud server 200 has not detected a subject, and the dog is set as the main subject. In the state of FIG. 5C, the camera 100 has detected a subject, the cloud server 200 is in the process of detecting a subject, and the dog remains set as the main subject. In the state of FIG. 5D, the cloud server 200 has detected a subject, and the dog detected as an Akita dog is set as the main subject. Since the cloud server 200 identifies even the breed of the dog, the CPU 113 can use the result of subject detection by the cloud server 200 to set shooting parameters suitable for the subject.

FIGS. 6A to 6E are diagrams showing an example in which the cloud server 200 detects a subject different from the subject detected by the camera 100. In the example of FIGS. 6A to 6E, it is assumed that the subject detection unit 106 of the camera 100 can detect people but does not have a dictionary (learned model) for detecting birds and that the subject detection unit 202 of the cloud server 200 can detect both people and birds.

FIG. 6A shows a state in which a bird and a person appear in the angle of view. At the instant when the bird and the person appear, the camera 100 and the cloud server 200 have not detected a subject. At S101 in FIG. 4, the subject detection unit 106 detects a subject from the image data. Also, the image data shown in FIG. 6A is transmitted to the cloud server 200 in a case where a predetermined condition is satisfied.

FIG. 6B shows a state in which the person detected by the subject detection unit 106 is enclosed by a dotted line rectangle region 401 to notify the user that the person is detected as the subject. Meanwhile, upon receiving the image data from the camera 100, the subject detection unit 202 of the cloud server 200 detects a subject from the image data (S107 in FIG. 4).

FIG. 6C shows a state of waiting for a detection result from the cloud server 200. As shown in FIG. 6C, to notify the user that the system is waiting for a detection result from the cloud server 200, the CPU 113 displays an icon 402 indicating that a subject is being detected by the cloud server 200.

FIG. 6D shows a state in which a subject detection result has been received from the cloud server 200 and the subject detected by the subject detection unit 202 is enclosed by a solid line rectangle 403 to notify the user that the subject is set as the main subject. In the example of FIG. 6D, the subject detection unit 202 of the cloud server 200 detects a person and a bird as subject candidates, but since the person is facing sideways, the bird is detected as the main subject.

In a case where multiple subjects are detected, the main subject may be determined based on the orientation, size, or the like of the detected subjects or portions of the subjects (such as a person's face). Also, the main subject may be determined based on the distance from the camera 100, the position in the angle of view, the type of subject, and the like.

FIG. 6E is a diagram showing the subject detection states and the main subjects in the states shown in FIGS. 6A to 6D. In the state of FIG. 6A, neither the camera 100 nor the cloud server 200 has detected a subject, and the main subject is not set. In the state of FIG. 6B, the camera 100 has detected a subject, the cloud server 200 has not detected a subject, and the person is set as the main subject. In the state of FIG. 6C, the camera 100 has detected a subject, the cloud server 200 is in the process of detecting a subject, and the person remains set as the main subject. In the state of FIG. 6D, the cloud server 200 has detected a subject, and the main subject has been changed to the bird. Since the cloud server 200 can detect the bird that is not detected by the camera 100, the CPU 113 can use the result of subject detection by the cloud server 200 to set shooting parameters suitable for the subject.

The subject detection state does not have to be indicated by a dotted line or solid line rectangle and may be notified to the user in other manners. For example, the detection state of a subject may be notified by changing the color of the line enclosing the subject or displaying an icon in or around the subject region.

Still Image Shooting

Referring to FIG. 7, still image shooting of the camera 100 is now described. Still image shooting starts when the shutter 102 is pressed during LV shooting and the release switch SW2 is turned on.

FIG. 7 is a flowchart illustrating still image shooting processing. In a case where the camera 100 fails to detect a subject with high accuracy, the CPU 113 uses the detection result obtained from the cloud server 200 to perform shooting processing. At S201, the CPU 113 determines whether a result of subject detection by the subject detection unit 202 has been obtained from the cloud server 200 during LV shooting. In a case where a detection result has been obtained from the cloud server 200, the process proceeds to S204. In a case where a detection result has not been obtained from the cloud server 200, the process proceeds to S202.

Even if a detection result has been obtained from the cloud server 200, the CPU 113 may send the image data to the cloud server 200 and obtain a detection result in a case where a predetermined condition, such as that a predetermined time has elapsed since the obtainment, is satisfied.

At S202, the CPU 113 performs shooting processing based on the result of subject detection by the camera 100. The generated image data is saved in the recording medium 112. At S203, the CPU 113 waits until receiving a subject detection result from the cloud server 200.

The CPU 113 may perform AF processing and AE processing based on the result of subject detection by the camera 100 and wait until a subject detection result is received from the cloud server 200. In this case, the CPU 113 can perform the shooting processing other than AF processing and AE processing based on the received detection result of the cloud server 200. The CPU 113 may also wait until receiving a subject detection result from the cloud server 200 before performing shooting processing including AF processing and AE processing.

At S204, the CPU 113 performs shooting processing based on the result of subject detection by the subject detection unit 202 of the cloud server 200. In this case, the image data saved in the recording medium 112 at S202 is overwritten with the image data generated by the shooting processing at S204. Before the image data is overwritten with the image data generated at S204, the CPU 113 may display a message asking the user whether the image data is allowed to be overwritten. The image data generated at S204 may be saved as image data different from the image data saved in the recording medium 112 at S202.

Also, the shooting parameter setting information determined based on the result of subject detection by the subject detection unit 202 may be saved in the image data file saved in the recording medium 112 at S202. When reproducing the image data on the monitor 104, the CPU 113 may display the image data by applying the shooting parameter setting information stored in the same file.

Furthermore, in a case where the detected subject is the same in the detection result of the camera 100 and the detection result of the cloud server 200, the CPU 113 may use the detection result of the subject obtained by the camera 100 at S204.

In a case where the same subject is detected but the shooting parameter settings determined by the camera 100 differ from the settings determined by the parameter determination unit 204, the CPU 113 may perform the shooting processing using the shooting parameter settings determined by the parameter determination unit 204. In this manner, the CPU 113 first performs shooting processing using the shooting parameter settings determined by the camera 100 and, upon receiving a detection result from the cloud server 200, performs shooting processing using the shooting parameter settings determined based on the received detection result.

Although FIG. 7 illustrates still image shooting, the present invention can also be applied to moving image shooting. In the same manner as the live view shooting processing, the camera 100 uses the subject detection results obtained by the camera 100 and the cloud server 200, so that the camera 100 can record a moving image obtained through shooting processing performed according to the subject detected with higher accuracy.

Processing for Each Shooting Parameter (1. AF processing) Advantages of using the subject detection results obtained by the camera 100 and the cloud server 200 in AF processing are now described. When shooting a moving subject, it is important to focus immediately when a subject appears in the angle of view, and to continue focusing as the subject moves. For example, in a case where shooting a car with the camera 100 capable of car detection, the subject detection unit 106 immediately performs AF processing on the entire area of the detected car or an area including the detected position.

Since the subject detection unit 106 of the camera 100 has sufficient capability in terms of car detection speed, the CPU 113 can immediately focus on the area including the detected car. However, when shooting a car, the area to be focused on changes depending on the vehicle type or the orientation of the car. Thus, the camera 100 transmits image data to the cloud server 200 and obtains a result of subject detection by the subject detection unit 202.

The subject detection unit 202 of the cloud server 200 identifies the vehicle type from the received image data. The parameter determination unit 204 determines, as the AF area, an area of interest (for example, the headlight portion) set in advance corresponding to the identified vehicle type. The cloud server 200 transmits, as the detection result, the subject detected by the subject detection unit 202 (the car whose vehicle type is identified) and the AF area information determined by the parameter determination unit 204 (AF processing setting information) to the camera 100.

By switching the AF area based on the received detection result, the CPU 113 can perform AF processing with higher accuracy than when AF processing is performed based on the detection result of the subject detection unit 106. The use of the subject detection result obtained by each of the camera 100 and the cloud server 200 allows the camera 100 to achieve both detection speed and detection accuracy.

(2. Brightness Correction Processing and Gradation Correction Processing) Advantages of using the subject detection results obtained by the camera 100 and the cloud server 200 in brightness correction processing and gradation correction processing are now described. It is assumed that the subject detection unit 106 of the camera 100 can simply detect a person and that the subject detection unit 202 of the cloud server 200 can additionally detect the person's race, gender, age, and the like.

In a case where the result of subject detection by the subject detection unit 106 of the camera 100 is used, the race, gender, age, and the like of the person are not identified. This may cause the camera 100 to fail to achieve the optimum brightness for the person. As described with reference to FIG. 7, in a case where the result of subject detection by the subject detection unit 202 of the cloud server 200 is obtained and used, the camera 100 can determine the optimum brightness according to the person's race, gender, age, or the like. For example, in a case where the cloud server 200 identifies that the person is a fair-skinned woman, the camera 100 may perform brightness correction processing based on the detection result obtained from the cloud server 200 to brighten the face of the woman.

Also, the use of the detection results of both the camera 100 and the cloud server 200 has advantages. For example, when shooting a person against the light, determining the exposure conditions for achieving the desired brightness without using the subject detection results may increase the gain applied in image processing and thus increase noise.

In contrast, in a case where the subject detection result is obtained by the subject detection unit 106, the camera 100 can shoot a still image under exposure conditions close to the optimum brightness. In this case, as compared to a configuration that does not use the detection result obtained by the subject detection unit 106, the gain applied in the image processing is limited, thereby limiting an increase in noise. The camera 100 can limit noise by using not only the detection result obtained by the cloud server 200 but also the detection result obtained by the camera 100.

(3. White Balance Processing) Advantages of using the subject detection results obtained by the camera 100 and the cloud server 200 in white balance processing are now described. In a case where the subject detection unit 106 of the camera 100 has lower detection accuracy than the cloud server 200, a subject such as blue sky, soil, or bricks tends to be erroneously determined as white. For this reason, the camera 100 transmits image data to the cloud server 200 and obtains a result of subject detection by the cloud server 200.

The subject detection unit 202 of the cloud server 200 detects a subject that tends to be erroneously determined as white in the image data received from the camera 100. The parameter determination unit 204 determines the setting for white balance processing by excluding the evaluation value such as the integration value of the area including the subject that tends to be erroneously determined as white. The CPU 201 transmits the setting information for white balance processing to the camera 100.

The use of the setting information for white balance processing received from the cloud server 200 allows the image processing unit 105 of the camera 100 to perform more accurate white balance processing on the image data. The camera 100 may obtain information on the area of the subject that tends to be erroneously determined as white from the cloud server 200, and the CPU 113 may determine the setting for white balance processing.

The result of subject detection by the subject detection unit 106 of the camera 100 is used when LV shooting starts, the main subject changes, the scene changes (for example, when indoor shooting changes to outdoor shooting), or the like. By using the result of subject detection by the subject detection unit 106, the camera 100 can quickly perform white balance processing even when a detection result is not obtained from the cloud server 200.

(4. Color Tone Correction Processing) Advantages of using the subject detection results obtained by the camera 100 and the cloud server 200 in color tone correction processing are now described. In a case where the recording medium of the cloud server 200 stores a dictionary for detecting landmarks such as famous buildings and landscapes, the subject detection unit 202 of the cloud server 200 can detect these landmarks.

For example, when the subject detection unit 202 detects the ocean in Hawaii as a subject, the parameter determination unit 204 determines the setting for color tone correction processing so as to vividly express the emerald green of the ocean and the color of the sky. The use of the setting information for color tone correction processing received from the cloud server 200 allows the image processing unit 105 of the camera 100 to perform more accurate color tone correction processing on the image data.

The result of subject detection by the subject detection unit 106 of the camera 100 is used when LV shooting starts, the main subject changes, the scene changes, or the like. By using the result of subject detection by the subject detection unit 106, the camera 100 can quickly perform color tone correction processing even when a detection result is not obtained from the cloud server 200.

According to the above-described embodiment, the camera 100 transmits image data to the cloud server 200 and obtains a result of subject detection by the cloud server 200, thereby recognizing the subject with high accuracy. In addition, the camera 100 uses the result of subject detection by the camera 100 until the subject detection result is received from the cloud server 200, thereby limiting a decrease in subject recognition speed.

The above-described embodiment is an example in which the camera 100 uses the result of subject detection by the cloud server 200 with higher detection accuracy. However, the present disclosure is not limited to this. The camera 100 may use a result of subject detection by another electronic device, such as a smartphone, that has higher detection accuracy than the camera 100, even if the detection accuracy is not as high as that of the cloud server 200.

Furthermore, the camera 100 may obtain subject detection results from multiple electronic devices or the cloud server 200 according to the types of subject dictionaries held by the respective the electronic devices and the cloud server 200. For example, the camera 100 may obtain a subject detection result relating to people from a smartphone, and obtain a subject detection result relating to landmarks or landscapes from the cloud server 200. By obtaining a detection result relating to people from a smartphone that has a faster response speed than the cloud server 200, the camera 100 can limit a decrease in person recognition speed.

The present invention is not limited to the preferred embodiments described above, and various modifications and variations can be made within the scope of the invention. Also, a plurality of features of the described embodiments may be appropriately combined.

The present disclosure provides an image capturing apparatus that improves the speed and accuracy of the recognition of subjects while limiting an increase in the circuit size of the subject detection circuit in an image capturing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-179591, filed on Nov. 2, 2021, which is hereby incorporated by reference herein in its entirety.

What is claimed is:

1. An image capturing apparatus comprising at least one memory and at least one processor which function as:
   an image capturing unit configured to control an imaging sensor;
   a first obtaining unit configured to obtain a first detection result that is a result of detection of a subject from image data captured by the image capturing unit;
   a second obtaining unit configured to transmit the image data to an image processing apparatus and obtain a second detection result that is a result of detection of a subject from the image data by the image processing apparatus;
   a control unit configured to perform shooting processing using settings of shooting parameters determined based on at least one of the first detection result and the second detection result; and
   a display control unit configured to notify a user of a subject of the first detection result and a subject of the second detection result,
   wherein the control unit is configured to perform shooting processing using settings of the shooting parameters determined based on the first detection result until the second detection result is obtained from the image processing apparatus, and
   wherein the display control unit is configured to notify the user such that the user can distinguish between a subject that is based on the first detection result and a subject that is based on the second detection result.

2. The image capturing apparatus according to claim 1, wherein the second detection result includes information of a detected subject detected by the image processing apparatus and setting information of the shooting parameters determined based on the detected subject.

3. The image capturing apparatus according to claim 1, wherein the control unit is configured to perform shooting processing using the settings of the shooting parameters determined based on the first detection result and, upon obtaining the second detection result from the image processing apparatus, perform shooting processing using settings of the shooting parameters determined based on the second detection result.

4. The image capturing apparatus according to claim 1, wherein the display control unit is configured to, until the second detection result is received, display an item indicating a status in which the second detection result is being obtained.

5. The image capturing apparatus according to claim 1, wherein the shooting parameters include a parameter for at least one of AF processing (autofocus processing), AE processing (autoexposure processing), white balance processing, brightness correction processing, color tone correction processing, and gradation correction processing.

6. The image capturing apparatus according to claim 5, wherein the control unit is configured to, in a case where the second detection result has not been received from the image processing apparatus, determine settings for the AF processing and the AE processing among the shooting parameters based on the first detection result, and to determine settings of the shooting parameters other than for the AF processing and the AE processing based on the second detection result.

7. The image capturing apparatus according to claim 6, wherein the control unit is configured to, in a case where the second detection result has been obtained from the image processing apparatus in live view shooting, perform shooting processing using settings for the AF processing and the AE processing determined based on the second detection result.

8. The image capturing apparatus according to claim 1, wherein the second detection result has higher subject detection accuracy than the first detection result.

9. The image capturing apparatus according to claim 1, wherein the first obtaining unit is configured to detect a subject using a learned model prepared for each subject type.

10. The image capturing apparatus according to claim 1, wherein the second detection result includes information of a subject detected using a learned model prepared for each subject type.

11. The image capturing apparatus according to claim 1, wherein the second obtaining unit is configured to, in a case where a predetermined condition is satisfied, transmit the image data to the image processing apparatus and obtain the second detection result.

12. The image capturing apparatus according to claim 11, wherein the predetermined condition is one of that the second detection result has never been received from the image processing apparatus since starting live view shooting, that a predetermined time has elapsed since receiving the second detection result, that the first obtaining unit has detected a new subject, that a subject of the second detection result has disappeared from an angle of view, and that a scene of the image data has changed.

13. A method for controlling an image capturing apparatus, the method comprising:
   a first obtaining step of obtaining a first detection result that is a result of detection of a subject from image data captured by an imaging sensor;
   a second obtaining step of transmitting the image data to an image processing apparatus and obtaining a second detection result that is a result of detection of a subject from the image data by the image processing apparatus;
   a control step of performing shooting processing using settings of shooting parameters determined based on at least one of the first detection result and the second detection result; and
   a display control step of notifying a user of a subject of the first detection result and a subject of the second detection result,
   wherein the control step includes performing shooting processing using settings of the shooting parameters determined based on the first detection result until the second detection result is obtained from the image processing apparatus, and
   wherein the display control step includes notifying the user such that the user can distinguish between a subject that is based on the first detection result and a subject that is based on the second detection result.

14. A non-transitory computer-readable medium that stores a program, wherein the program causes a computer to execute:

a first obtaining step of obtaining a first detection result that is a result of detection of a subject from image data captured by an imaging sensor;

a second obtaining step of transmitting the image data to an image processing apparatus and obtaining a second detection result that is a result of detection of a subject from the image data by the image processing apparatus;

a control step of performing shooting processing using settings of shooting parameters determined based on at least one of the first detection result and the second detection result; and a display control step of notifying a user of a subject of the first detection result and a subject of the second detection result, wherein the control step includes performing shooting processing using settings of the shooting parameters determined based on the first detection result until the second detection result is obtained from the image processing apparatus, and wherein the display control step includes notifying the user such that the user can distinguish between a subject that is based on the first detection result and a subject that is based on the second detection result.

* * * * *